Dec. 17, 1935.      S. OSTERMAN      2,024,741
CONTAINER, DISPENSER AND THE LIKE
Filed March 24, 1934
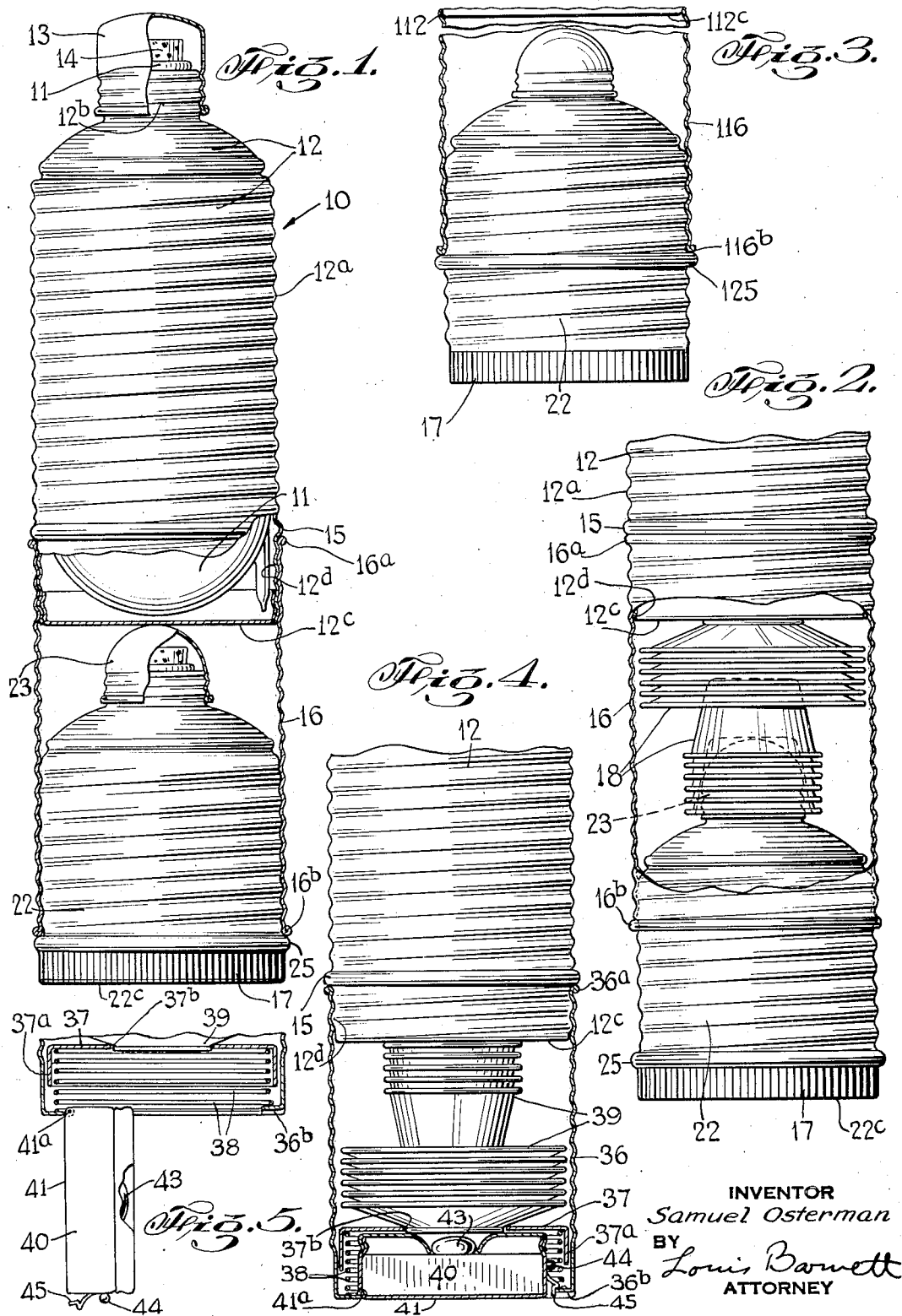
INVENTOR
Samuel Osterman
BY
Louis Barrett
ATTORNEY Patented Dec. 17, 1935

2,024,741

UNITED STATES PATENT OFFICE 2,024,741

CONTAINER, DISPENSER, AND THE LIKE

Samuel Osterman, Brooklyn, N. Y., assignor to Guth, Stern & Co., Inc., a corporation of New York Application March 24, 1934, Serial No. 717,141

5 Claims. (Cl. 206—4)

This invention relates to containers and dispensers for liquids or the like, and more particularly is directed to container or dispenser constructions which permit coupling or attaching thereto other containers, receptacles, or other accessories.

Among the objects of the invention is to improve constructions of the character described, said constructions comprising few and simple parts which shall be easily assembled, which shall form a compact device yet be neat and attractive in appearance, which shall be cheap to manufacture, and which shall be practical and efficient to a high degree in use.

Other objects of the invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawing, in which is shown various possible illustrative embodiments of this invention:

Fig. 1 is a front elevational view of a construction embodying the invention, partly broken away to show the interior.

Fig. 2 is a view similar to Fig. 1 showing dishes stored between two coupled containers.

Fig. 3 is a fragmentary front elevational view partly broken away showing the coupling member between two containers formed integrally with the casing of one.

Fig. 4 is a fragmentary front elevational view of another embodiment of the invention showing a storage receptacle attached to a container partly broken away to show the interior construction, and Fig. 5 is a fragmentary front elevational view of the lower portion of the storage receptacle illustrated in Fig. 4 showing the flashlight in open position.

Referring in detail to the drawing, 10 denotes a construction embodying the invention here shown applied to a heat insulated container comprising the usual glass "vacuum" or "thermos" bottle 11 of any well understood manufacture housed in a sheet metal casing 12, said casing 12 may be spirally or helically corrugated on the cylindrical wall 12a thereof, the neck 12b of said casing being fitted with a metallic cup cover 13 for enclosing the stopper or cork 14 of the bottle 11. A bottom closure 12c seals the bottle 11 in casing 12 as is clearly shown in Fig. 1. The corrugations on the wall 12a are preferably constructed to serve as a screw thread which is interrupted by an abutment bead 15 positioned a short distance up from the casing bottom closure 12c.

In the embodiment of the invention shown in Figs. 1 and 2, the upper container or "vacuum" bottle 11 above described, may be used to hold hot or cold liquids or the like. If it is desired to couple or attach to said upper container, a second or lower like container having a similar threaded corrugated casing 22 formed with an abutment bead 25 and provided with a cap 23, a metallic corrugated tube or sleeve 16 is provided. The corrugations on the sleeve 16 are shaped, sized and proportioned to cooperate with the thread corrugations of the two (upper and lower) containers above described and shown in Fig. 1.

The utility of the invention is now apparent. The two containers which may be filled with different liquids or liquids of different temperatures can be coupled in compact form by simply screwing the sleeve 16 on thread corrugated portions 12d of the first described (upper) container until the upper rolled edge 16a seats against the abutment bead 15. The second described (lower) container can then be threaded into the sleeve 16 until the lower rolled edge 16b seats on the bead 25 or until the cap 23 strikes the bottle closure 12c of casing 12. The periphery surface adjacent the bottom 22c of said lower container may be knurled to facilitate turning the latter into the sleeve 16.

In Fig. 2 is shown dishes 18 stored between the upper and lower containers within the sleeve 16. The latter, in the combination shown and described, is thus seen to form an extensible receptacle for dishes 18 or other articles.

It is to be understood that the sleeve and containers may be made to have slidingly telescopic joints or couplings instead of the screw threads, although the above corrugated surfaces are preferred since such adds to the attractiveness as well as to strength of the structure.

A modification of the construction above described is shown in Fig. 3. Here the sleeve portion 116 may be made integral with the casing 112 and extended beyond the bottom closure 112c, the rolled edge 116b of said portion being adapted to seat on the bead 125 of the lower container.

Still another embodiment of the invention is shown in Figs. 4 and 5. The container may include the casing 12, bead 15, thread portion 12d and bottom closure 12c similar to the upper container first described and shown in Figs. 1 and 2.

On the thread portion 12d a receptacle 36 is screwed, said receptacle having a rolled upper edge 36a and bottom 36b. An inner bottom member 37 having a downturned peripheral flange 37a slidingly fits within the receptacle 36 adjacent to the bottom 36b. A coil spring 38 is interposed between said bottom 36b and member 37 to urge the latter two apart. Dishes 39 or other articles may be placed on the bottom member 37 for storing in the receptacle 36. The spring 38 acting on the member 37 provides resilient means for retaining the dishes 39 between said member 37 and the bottom wall 12c of the upper container, and thereby reduces to a minimum possible breakage due to rough handling or accident. The bottom member 37 may be cut out or otherwise formed as at 37b to facilitate the packing or nesting of the article stored in the receptacle 36.

Figs. 4 and 5 also show another embodiment of the invention. The space within the receptacle 36 under the bottom member 37, as shown in Fig. 4, may be utilized for an accessory, as for example, a flashlight 40. Said flashlight may be of any well known or suitable construction and as here shown is like that shown and described in my copending application, Ser. No. 712,949, filed February 26, 1934.

As seen from Figs. 4 and 5, the flashlight 40 is mounted on a plate 41 which is hinged at 41a to the bottom side of the receptacle 36. The electric current carrying parts and battery (not shown), switch 44 enclosed within the flashlight, and lamp 43 connected therewith may be mounted as a unit on said plate 41. On releasing spring catch 45, the plate 41 can be swung on the hinge 41a, and then on operating the switch 44, the light from lamp 43 is made available in the well understood manner.

It will thus be seen that there are provided devices whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A container, a receptacle joined in end to end relation at the bottom of said container resilient means in the receptacle for retaining articles stored therein against the bottom of the container.

2. A container, a receptacle detachably connected to one end of the container, said receptacle having a storage compartment formed with a bottom wall, and a casing inserted in the bottom wall from the exterior side of said compartment, said casing when inserted in position extending wholly within the receptacle.

3. A container, a receptacle having a bottom side detachably connected with said container in end to end relation, a movable bottom member within said receptacle adjacent said bottom side, and a compression spring interposed between said member and side for retaining articles stored in said receptacle on said member against the bottom of the container.

4. A container, a receptacle having a bottom side detachably connected with said container in end to end relation, a movable bottom member within said receptacle adjacent said bottom side, a compression spring interposed between said member and side for retaining articles stored in sad receptacle on said member against the container, the bottom side of said receptacle being formed to support a casing, said casing being movably mounted on said side to extend wholly into the receptacle under said member.

5. A first vacuum bottle, a second vacuum bottle, each of said bottles having a screw thread corrugated cylindrical casing wall, and a corrugated sleeve member formed with a threaded wall corresponding to the screw thread casing walls of said bottles for coupling said bottles together in end to end relation to provide storage space therebetween.

SAMUEL OSTERMAN.